US006999501B1

(12) United States Patent
Sawyer (10) Patent No.: US 6,999,501 B1
(45) Date of Patent: Feb. 14, 2006

(54) METHOD AND DEVICE FOR ATTENUATING AN INTERFERER FROM A COMMUNICATION SIGNAL

(75) Inventor: Francois Sawyer, Quebec (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 953 days.

(21) Appl. No.: 09/662,740

(22) Filed: Sep. 15, 2000

(51) Int. Cl.
H04B 1/707 (2006.01)

(52) U.S. Cl. .................. 375/147; 375/144; 375/148; 375/346; 375/349; 370/333

(58) Field of Classification Search ............ 375/142, 375/144, 148, 150, 227, 260, 346, 347, 349, 375/147; 455/501, 63.1, 67.11, 67.13; 370/320, 370/335, 342, 333
See application file for complete search history.

(56) References Cited

U.S. PATENT DOCUMENTS

| 5,740,208 | A | * | 4/1998 | Hulbert et al. ............... 375/346 |
| 6,327,298 | B1 | * | 12/2001 | Grobert ....................... 375/148 |
| 6,515,980 | B1 | * | 2/2003 | Bottomley ................... 370/342 |
| 6,778,827 | B1 | * | 8/2004 | Anderson et al. ........... 455/434 |

FOREIGN PATENT DOCUMENTS

EP 0 967 734 A2 12/1999
WO WO 99/38270 * 7/1999

OTHER PUBLICATIONS

Paul Dent et al., *CDMA-IC: A novel code division multiple access scheme based on interference cancellation*, IEEE, 1992.

* cited by examiner

Primary Examiner—Khai Tran
Assistant Examiner—Edith Chang
(74) Attorney, Agent, or Firm—Sandra Beauchesne, Ericsson Canada Inc.

(57) ABSTRACT

The method and device attenuate an interferer of substantially known spectrum in a communication signal which has been transmitted through a transmission channel and processed through a signal-processing receiver chain. In these method and device, the substantially known spectrum is used to generate, independently of the communication signal, at least one image representative of a replica of the interferer after processing through the signal-processing receiver chain. The generated image is subtracted from the processed communication signal to produce a subtraction signal, and quality-indicative parameters of the processed communication signal and the subtraction signal(s) are calculated. Finally, the quality-indicative parameters are used to select one of the processed communication signal and subtraction signal(s) for further processing through the receiver. When a plurality of images are generated, these images have different features, for instance different amplitudes or phases. At least one image can be feedback controlled in relation to the quality-indicative parameter of the subtraction signal corresponding to this image, in view of improving the quality-indicative parameter of this subtraction signal. This feedback control can also be responsive to the signal selection to improve the quality-indicative parameter of the subtraction signal until the latter signal is selected for further processing through the receiver.

39 Claims, 5 Drawing Sheets

METHOD AND DEVICE FOR ATTENUATING AN INTERFERER FROM A COMMUNICATION SIGNAL

BACKGROUND OF THE INVENTION

1. Field of the Invention

The present invention relates to the field of communications and more specifically to the attenuation of an unwanted interferer signal from a communication signal.

2. Brief Description of the Prior Art:

In a cellular telephone system, CDMA (Code Division Multiple Access), including IS-95 and WCDMA (Wideband Code Division Multiple Access), offers an inherent protection against narrowband interference. CDMA relies on a despreading operation to minimise the interference effects of undesired signals, including noise. However, this protection has a cost since it often requires a higher transmission power in order to provide the receiver with sufficient gain over the interference, i.e. to provide the required minimum signal-to-noise ratio. This requirement for higher transmission power reduces the range and the capacity of the network. On the uplink side, this also reduces the mobile station battery duration.

In an article entitled "CDMA-IC: A NOVEL CODE DIVISION MULTIPLE ACCESS SCHEME BASED ON INTERFERENCE CANCELLATION", and published by IEEE (Institute of Electrical and Electronics Engineers) in 1992, Paul DENT, Björn GUDMUNDSON and Magnus EWERBRING disclose a method for reducing interference in the CDMA signal of one user caused by the CDMA signals of the other users. For that purpose, the user received at higher signal strength is first identified and despread, and this despread signal is subtracted from the composite signal. Thus, for other users' signals not yet despread, interference is made less significant, and their signal-to-noise ratio is improved. Obviously, this method attenuates only interference related to other CDMA users' signals.

In PCT international patent application published under No. WO 99/38270 on Jul. 29, 1999, Terence WIDDOWSON proposes an apparatus for decoding a spread spectrum signal which has been transmitted via a transmission channel. This spread spectrum signal comprises a wanted spread spectrum signal component and an unwanted narrowband signal component. The narrowband signal has been coded using a coding scheme with error correction capabilities. This apparatus includes a narrowband signal substractor in which:

the composite signal is decoded and corrected according to the narrowband signal coding scheme to provide a decoded version of the narrowband signal;

the amplitude and phase characteristics of the transmission channel are estimated;

the decoded corrected signal is encoded according to the narrowband signal coding scheme to produce an estimated narrowband signal;

the phase and amplitude of the estimated narrowband signal are adjusted according to the estimate amplitude an phase characteristics; and the adjusted signal is subtracted from the received composite signal to provide an estimate of the spread spectrum signal component.

The narrowband coding scheme can also detect uncorrectable errors. Upon detection of an uncorrectable error, the above mentioned subtraction is suppressed and the frequencies of the composite signal corresponding to the narrowband signal component are attenuated.

Therefore, the apparatus of PCT international patent application WO 99/38270 requires:

decoding and correction of the composite signal;

estimation of the amplitude and phase characteristics of the transmission channel;

encoding of the decoded corrected signal according to the narrowband signal coding scheme;

to produce an estimated narrowband signal.

Document EP 0 967 734 A2 (Suzuki) published on Dec. 29, 1999 relates to a DS-CDMA multiuser interference canceller for processing a received signal containing CDMA spread signals from a plurality of users. The function of this canceller is to remove, from the signal of each user, signals of other users and thereafter decode the signal of this specific user. This obviously eliminates interference caused by the spread signal of the other users.

For that purpose, interference replica signals identical to signal components of the users are generated from a received composite signal and, for every user, the interference replica signals from the other users are subtracted from the received composite signal.

When subtraction of the interference replica signals from the composite signal does not improve reception quality, outputting of these interference replica signals is turned off. Reception quality may be monitored through BER measurement.

Alternatively, a control process can be used to control the level of the interference replica signals, rather than controlling turning on and off of the interference cancellation process.

Again, processing of the received composite signal is required to obtain the interference replica signals. Also, adjustment of the level of the interference replica signal is made according to a predetermined pattern. More specifically, according to the teaching of this document, the level of the interference replical signal is increased with time so that the interference cancellation process is less susceptible to the effect of the delay in a control process.

OBJECTS OF THE INVENTION

An object of the present invention is to use the substantially known spectrum of an interferer to generate an image of this interferer independently of a received communication signal.

Another object of the present invention is to use a plurality of images having different features and a selection of one of these images which best attenuates the interferer.

A third object of the present invention is to use a feedback controlled image of the interferer to optimize attenuation of the interferer.

SUMMARY OF THE INVENTION

More specifically, in accordance with the present invention, there is provided a method for attenuating an interferer of substantially known spectrum in a communication signal which has been transmitted through a transmission channel and processed through a signal-processing receiver chain. This method comprises generating, from the substantially known spectrum and independently of the communication signal, at least one image representative of a replica of the interferer after processing through the signal-processing receiver chain. The image is subtracted from the processed communication signal to produce a subtraction signal, a quality-indicative parameter of the processed communication signal is calculated, and the quality-indicative parameter for the subtraction signal is computed. Finally, the method selects, in relation to the quality-indicative parameters, one of the processed communication signal and subtraction signal for further processing through the receiver.

According to preferred embodiments of the above method:

the interferer is a narrowband AMPS interferer, the communication signal is a CDMA spread spectrum signal, the signal-processing receiver chain incorporates a despreading scheme whose function is to convert the spread spectrum signal to a despread signal, and the replica is a silent replica of the interferer including no voice of data component; and the quality-indicative parameters are BER measurements of the despread signal and subtraction signal.

The present invention also relates to a method for attenuating an interferer from a communication signal which has been transmitted through a transmission channel and processed through a signal-processing receiver chain, wherein, a plurality of images of the interferer having different features are generated, for each interferer image the interferer image is subtracted from the processed communication signal to produce a corresponding subtraction signal, a quality-indicative parameter of the processed communication signal is calculated, and the quality-indicative parameter is calculated for every subtraction signal. The method finally comprises selecting, in relation to the quality-indicative parameters, one of the processed communication signal and subtraction signals for further processing through the receiver.

Preferably, the features of the images comprises amplitudes of these images.

The present invention is further concerned with a method for attenuating an interferer from a communication signal which has been transmitted through a transmission channel and processed through a signal-processing receiver chain, comprising generating an image of the interferer, subtracting the interferer image from the processed communication signal to produce a subtraction signal, calculating a quality-indicative parameter of the processed communication signal, computing the quality-indicative parameter for the subtraction signal, and selecting, in relation to the quality-indicative parameters, one of the processed communication signal and subtraction signal for further processing through the receiver. At least one feature of the image of the interferer is feedback controlled in relation to the quality-indicative parameter of the subtraction signal in view of improving this quality-indicative parameter of the subtraction signal.

Preferably, this feedback control takes into consideration the selection to improve the quality-indicative parameter of the subtraction signal until the subtraction signal is selected for further processing through the receiver.

The present invention also provides corresponding devices for implementing the above defined interferer attenuating methods.

Finally, the present invention relates to a method of generating an image of an interferer of substantially known spectrum for use in attenuating this interferer in a communication signal which has been transmitted through a transmission channel and processed through a signal-processing receiver chain. This method comprises generating a replica of the interferer from the substantially known spectrum and independently of the communication signal, and processing the interferer replica through transfer functions reproducing the signal-processing receiver chain in view of producing the interferer image.

Preferably, a gain is applied to the processed interferer replica. Also, both generating of an interferer replica and processing of the interferer replica can be conducted through a digital implementation such as software, firmware (e.g. PROM (Programmable Read-Only Memory)), ASIC (Application Specific Integrated Circuit).

Other objects, advantages and features of the present invention will become more apparent upon reading of the following non-restrictive description of preferred embodiments thereof, given by way of example only with reference to the accompanying drawings.

DETAILED DESCRIPTION OF THE PREFERRED EMBODIMENT

Although the preferred embodiment will be described with reference to CDMA communication in a cellular telephone system, it should be kept in mind that the present invention is not limited to this particular application.

Figure 1:
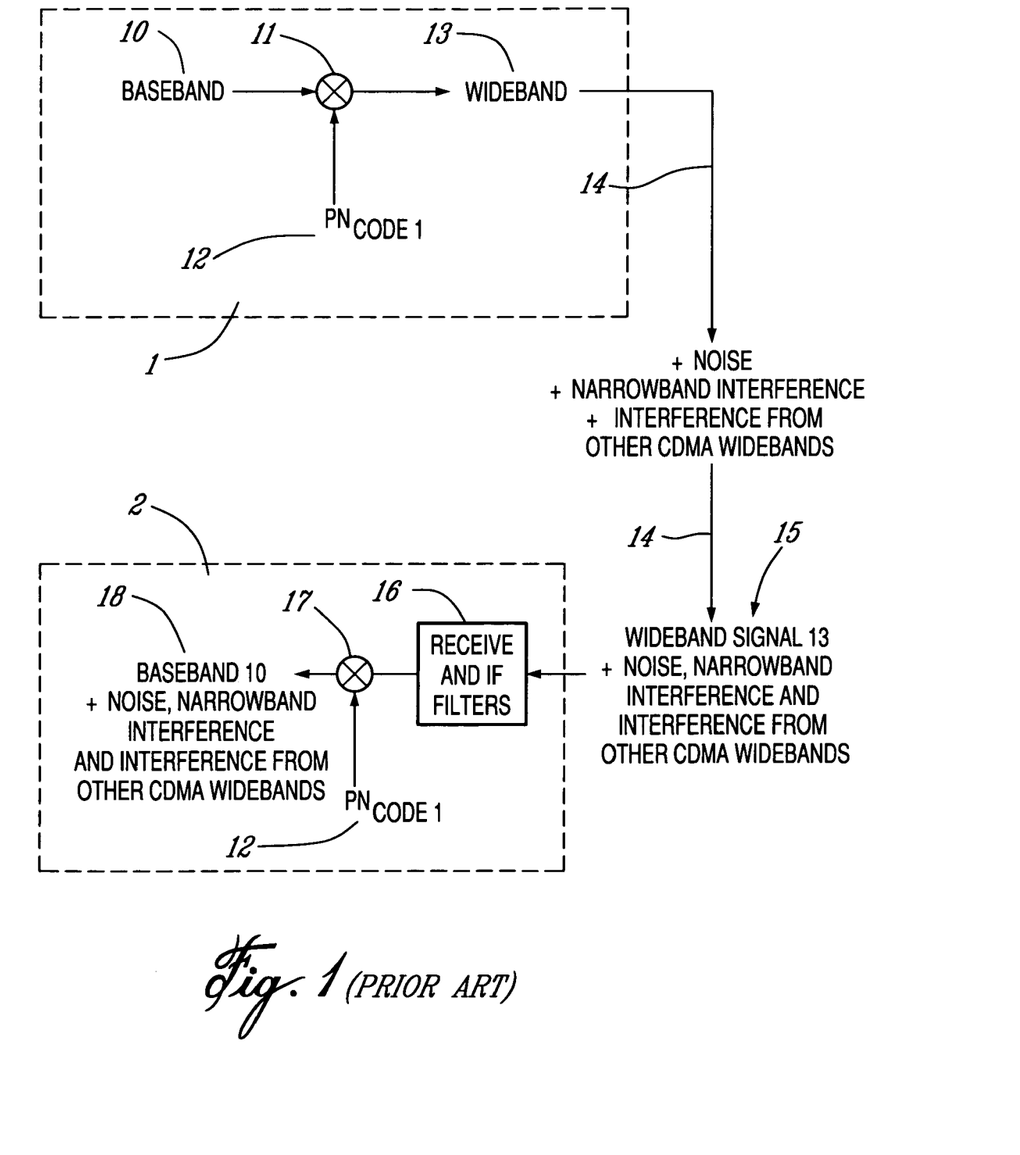
FIG. 1 is a schematic flow chart showing the general principle of operation of a CDMA communication scheme in a cellular telephone network.

As illustrated in FIG. 1, a CDMA transmitter 1 receives a baseband signal 10 containing, for example, "voice" or other signal of interest. The CDMA transmitter 1 then conducts a convolution 11 of this baseband signal 10 with a CDMA spreading code $PN_{code1}$ identified by the reference 12 in FIG. 1. As well known to those of ordinary skill in the art, the convolution 10 with the spreading code $PN_{code1}$ 12 spreads the spectrum of the baseband signal 10 to produce a wideband communication signal 13 (spread spectrum signal) subsequently transmitted over a transmission channel 14. In the case of a cellular telephone system, the transmission channel 14 uses air as transmission medium.

During transmission over the transmission channel 14, the wideband communication signal 13 can accumulate noise of all types. The wideband signal 13 can also be subjected to narrowband interference such as an AMPS (Advanced Mobile Phone System) signal. Finally, other CDMA wideband signals (each resulting from convolution of a baseband signal with another CDMA code $PN_{codex}$) transmitted through a common transmission medium, such as air, can add to the wideband signal 13. Just a word to recall that narrowband AMPS can have a high power and coexist with CDMA in the North American frequency spectrum.

A CDMA receiver 2, for example located in a base or mobile station of a cellular telephone system, accordingly receives a wideband signal 15 charged with noise of many types, and eventually narrowband AMPS interference and interference from other CDMA wideband signals.

The receiver 2 comprises receive and IF (Intermediate Frequency) filters 16 conventionally used to isolate as much as possible the original wideband signal 13 from the received, adjacent spectrum interference (not shown). The signal from the filters 16 is subjected to a convolution 17 with the original CDMA spreading code $PN_{code1}$ 12 to despread the spectrum of the wideband signal 15 (despread signal) and thereby recover a baseband signal 18 incorporating the original baseband signal 10 contaminated with the above mentioned noise, narrowband interference and interference from other CDMA wideband signals.

CDMA transmission of signals through the transmission channel 14 is otherwise well known to those of ordinary skill in the art and accordingly, will not be further described in the present specification.

The preferred embodiment of the present invention is concerned with handling of a narrowband AMPS interferer in a CDMA transmission system.

Figure 2:
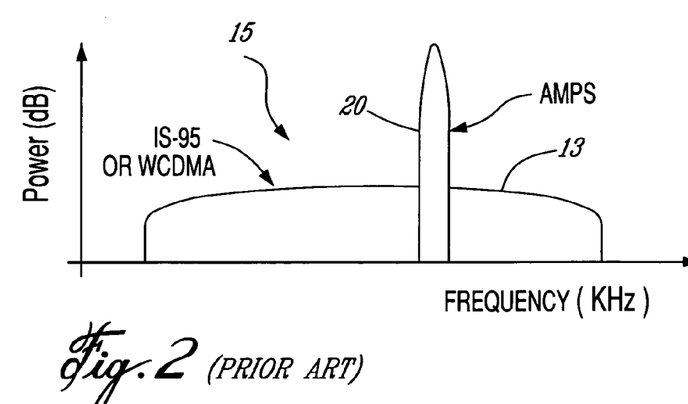
FIG. 2 is a graph illustrating the spectrum of an IS-95 or WCDMA wideband signal interfered by a narrowband AMPS interferer.

Referring to FIG. 2, which illustrates an example of a CDMA wideband signal 15 containing a narrowband interferer 20. In the illustrated example, the CDMA wideband signal 15 comprises a spread spectrum IS-95 or WCDMA signal 13 and a narrowband AMPS interferer 20.

Figure 3:
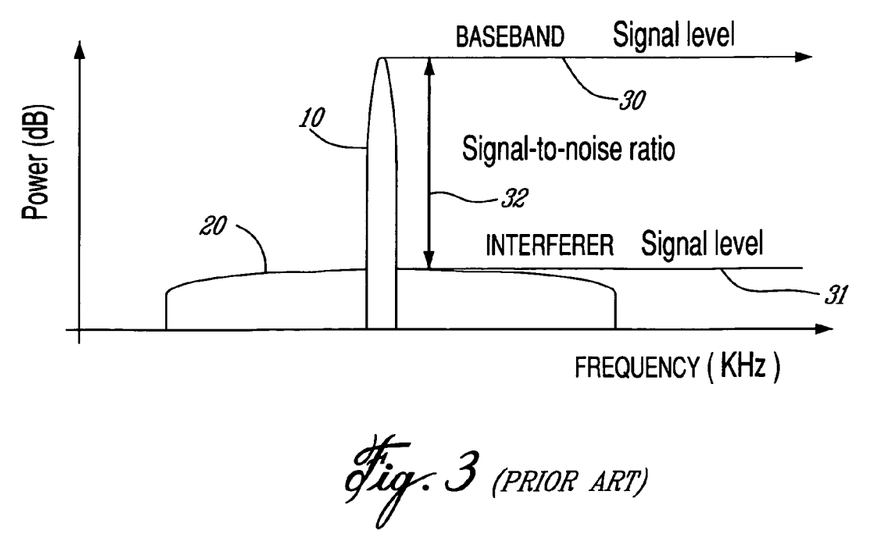
FIG. 3 is a graph illustrating the IS-95 or WCDMA wideband signal and the narrowband AMPS interferer of FIG. 2 after processing through a CDMA despreading scheme.

As illustrated in FIG. 3, processing of the CDMA wideband signal 15 through the filters 16 and convolution 17 thereof with the CDMA spreading code 12 despreads the spectrum of the CDMA wideband signal 13 to regenerate the baseband signal 10, including voice or other signal of interest, and spreads the spectrum of the AMPS narrowband interferer 20. In this way, the baseband signal 10 has a higher signal level 30 while the interferer 20 has a lower interferer signal level 31. Therefore, the power level of the baseband signal 10 of FIG. 3 is higher than the power level of the interferer 20.

Of course, an established, minimun signal-to-noise ratio 32 (FIG. 3) is required to ensure adequate communication. When the AMPS interferer 20 has too high a power level, the transmitter such as a mobile station of a cellular telephone system has to increase its transmission power to ensure a sufficient signal-to-noise ratio. This reduces the battery duration of the mobile station, this reduces the range of transmission since the power output of the mobile station is limited, and this obviously reduces the overall capacity of the cellular telephone system.

The present invention makes use of the knowledge of the interferer to cancel at least some components of this interferer. In the presently described preferred embodiment, a CDMA wideband signal is believed to be interfered by an AMPS signal.

For that purpose, an image of the AMPS interferer is first generated. Since the spectrum of the AMPS interferer is substantially known, this can be made through an image generator as illustrated in FIG. 4 independently the wideband signals 13 and/or 15.

It is usually correct to assume that speech is absent from an AMPS signal 60% of the time. Therefore, an AMPS replica 40 (FIG. 4) wanted to have as much as possible the same spectrum as the AMPS interferer 20 is generated by an AMPS replica sub-generator 41 in the CDMA receiver 2, assuming that the AMPS signal comes from a silent user. As indicated in the foregoing description, this is a true assumption for 60% of the time. This locally generated silent AMPS replica 40 will become an "image" of the AMPS interferer.

Figure 4:
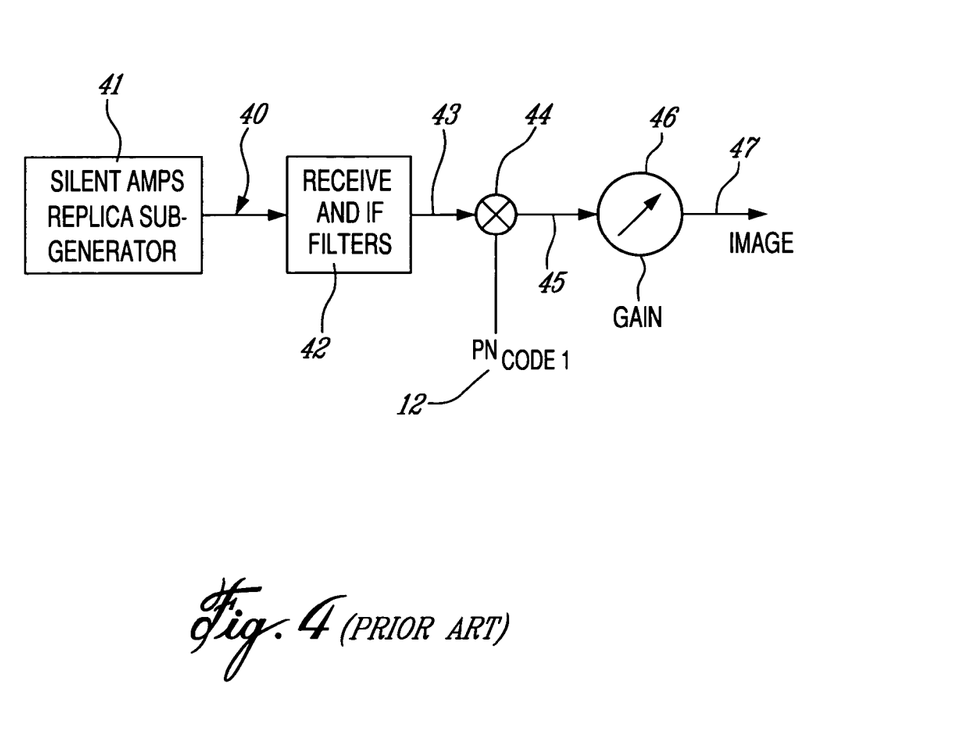
FIG. 4 is a schematic block diagram of a generator for producing an image of the narrowband AMPS interferer of FIG. 2.

Still referring to FIG. 4, the silent AMPS replica 40 is processed through the same transfer functions as the transfer functions imposed by the receiver to the wideband signal 15 including the AMPS interferer 20.

More specifically, the silent AMPS replica 40 is filtered by receive and IF filters 42 similar to the receive and IF filters 16 of the CDMA receiver 2 to produce a filtered silent AMPS signal 43. Then, convolution 44 of the filtered AMPS signal 43 with the same CDMA code $PN_{code1}$ 12 is performed to spread the spectrum of the filtered silent AMPS signal 43 and produce a spread spectrum silent AMPS signal 45. Finally, a gain (for example amplifier 46), adjustable or not, is applied to the spread spectrum silent AMPS signal 45 to produce the image 47 of the AMPS interferer 20.

Production of the image 47 does not need to be implemented as illustrated in FIG. 4. Of course, a digital implementation of the image generator of FIG. 4 can be built through software, firmware (e.g. PROM (Programmable Read-Only Memory)), ASIC (Application Specific Integrated Circuit) implementing the AMPS modulation and the necessary transfer functions.

Figure 5:
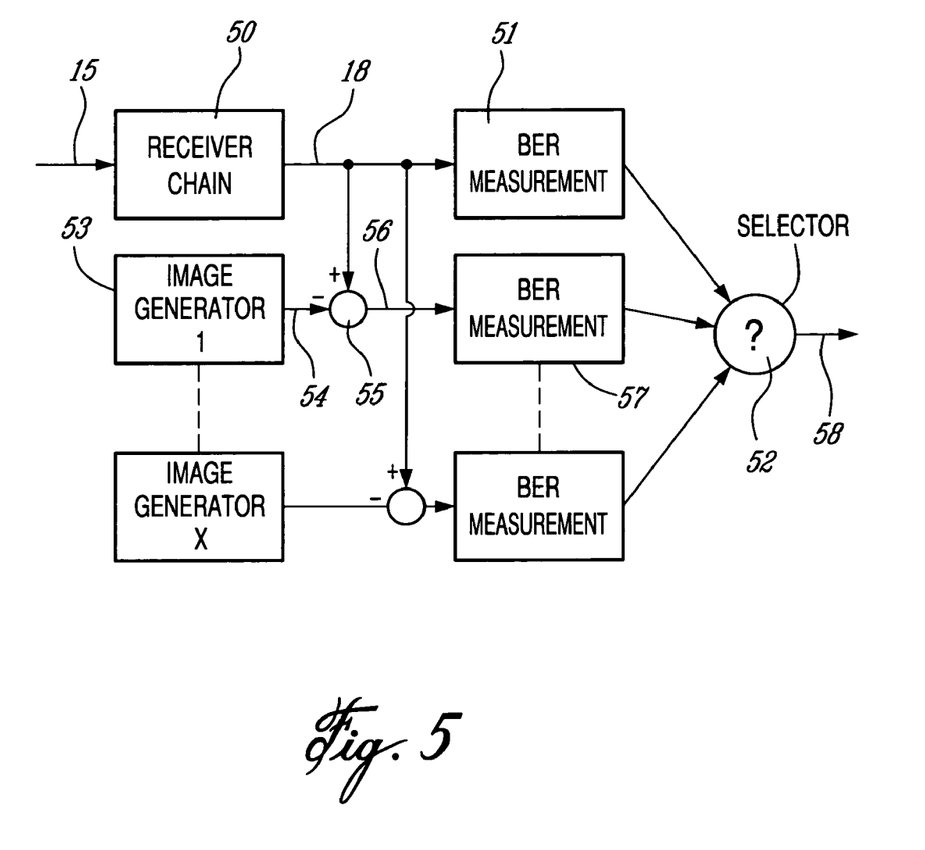
FIG. 5 is a schematic block diagram of a first preferred embodiment of a device for attenuating the AMPS interferer from the IS-95 or WCDMA communication signal following despreading thereof.

FIG. 5 illustrates a first implementation of a method and device for attenuating, that is removing at least some components of the AMPS interferer 20 from the baseband signal 18 (FIG. 1).

The baseband signal 18 is first produced by processing the wideband signal 15 of FIG. 1 through the CDMA receiver chain 50, including the filters 16 and convolution 17 of the CDMA receiver 2 (FIG. 1).

Bit error analysis is performed in a BER (Bit Error Rate) measurement module 51 on the baseband signal 18 and the resulting BER ratio is applied to a corresponding input of a selector 52. Bit error rate analysis measures the ratio of the amount of erroneous bits of a message to the total number of bits of the message received. Also, the BER ratio provides an estimation of the signal-to-noise ratio. Accordingly, the BER ratio constitutes a quality-representative parameter of the signal on which bit error analysis is performed.

At least one image generator 53 uses the scheme of FIG. 4 or a corresponding digital implementation such as software, firmware (e.g. PROM (Programmable Read-Only Memory)), ASIC (Application Specific Integrated Circuit) to generate an image 54 of the AMPS interferer 20. A subtractor 55 subtracts the image 54 from the baseband signal 18 to produce an image-removed baseband signal 56. BER measurement module 57 then conducts a bit error analysis on the image-removed baseband signal 56 and the resulting ratio is applied to a corresponding input of the selector 52.

If the BER ratio from module 51 is lower than the BER ratio from module 57, this means that the image 54 from generator 53 is not a good representation of the AMPS interferer 20. In that case, the image-removed baseband signal 56 is ignored and baseband signal 18 is selected by the selector 52 as the signal for further processing through the CDMA receiver 2.

If the BER ratio from module 51 is larger than the BER ratio from module 57, this means that at least a portion of the AMPS interferer 20 has been successfully cancelled from the baseband signal 18, and that the quality of the communication has been improved. When the BER ratio is sufficiently low and, therefore, the signal-to-noise ratio is sufficiently high, the power of transmission can be reduced, hence increasing the capacity and range of the cellular telephone system and the mobile station battery duration.

Many images of the AMPS interferer 20 can be generated through a series of image generators 1, 2, ..., X. As an example, parallel images can be produced for:
- various amplitudes of the AMPS interferer;
- various phases of the AMPS interferer;
- replacing the silent speech by AMPS signals representing background noise or actual voice (inasmuch as there is a possibility to identify known patterns that are worthwhile to generate in this context);
- etc.

For each image, a subtractor such as 55 subtracts the image from the baseband signal 18 to produce an image-removed baseband signal. A BER measurement module such as 57 then conducts a bit error analysis on the image-removed baseband signal and the resulting ratio is applied to a corresponding input of the selector 52. The selector 52 selects the signal having the lowest BER ratio amongst the baseband signal 18 and the image-removed baseband signals as the output signal 58 for further processing through the CDMA receiver 2 (FIG. 1).

CDMA signals comprise frames each having a duration of a few milliseconds. Normally, bit error analysis will be conducted through the modules such as 51 and 57 every frame. For example, since the AMPS interferer 20 carries voice and voice activity can change at any time, this is worthwhile repeating the above described process every CDMA frame.

Figure 6:
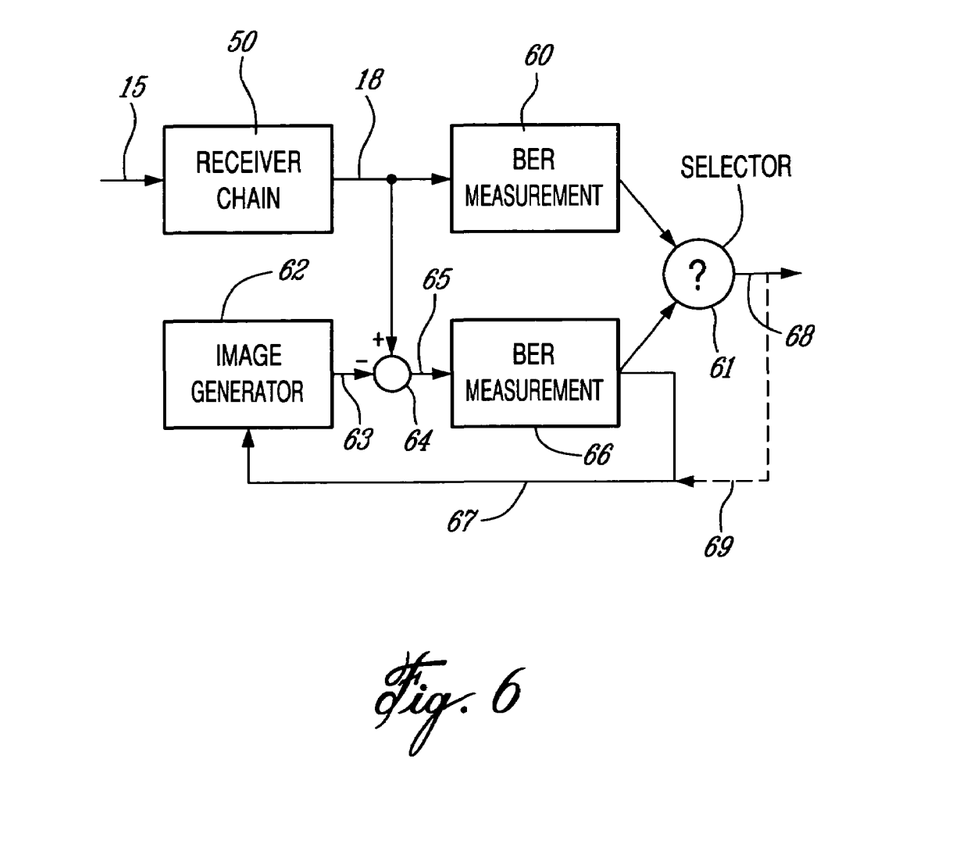
FIG. 6 is a schematic block diagram of a second preferred embodiment of a device for attenuating the AMPS interferer from the IS-95 or WCDMA communication signal following despreading thereof.

The AMPS interferer cancelling process can be greatly improved by means of a feedback loop between the BER measurement module and the image generator. FIG. 6 illustrates such an implementation, to remove components of the AMPS interferer 20 from the baseband signal 18 (FIG. 1).

Again, the baseband signal 18 is first produced by processing the wideband signal 15 of FIG. 1 through the CDMA receiver chain 50, including the filters 16 and convolution 17 (see the CDMA receiver 2 of FIG. 1).

Bit error analysis is performed in BER (Bit Error Rate) measurement module 60 on the baseband signal 18 and the resulting BER ratio is applied to a corresponding input of a selector 61.

At least one image generator 62 uses the scheme of FIG. 4 or a corresponding digital implementation such as software, firmware (e.g. PROM (Programmable Read-Only Memory)), ASIC (Application Specific Integrated Circuit) to generate an image 63 of the AMPS interferer 20. A subtractor 64 subtracts the image 63 from the baseband signal 18 to produce an image-removed baseband signal 65. BER measurement module 66 then conducts a bit error analysis on the image-removed baseband signal 65, and the resulting BER ratio is applied to a corresponding input of the selector 61.

Again, if the BER ratio from module 60 is lower than the BER ratio from module 66, this means that the image 63 from the generator 62 is not a good representation of the AMPS interferer 20. In that case, the image-removed baseband signal 65 is ignored and baseband signal 18 is selected by the selector 61 as the signal 68 for further processing through the CDMA receiver 2 of FIG. 1.

If the BER ratio from module 60 is larger than the BER ratio from module 66, this means that at least a portion of the AMPS interferer 20 has been successfully cancelled from the baseband signal, and that the quality of the communication has been improved. In this case, the image-remove baseband signal 65 is selected by the selector 61 as the signal 68 for further processing through the CDMA receiver. As indicated earlier in this description, when the BER ratio is sufficiently low and, therefore, the signal-to-noise ratio is sufficiently high, the power of transmission can be reduced, hence increasing the capacity and range of the cellular telephone system and the mobile station battery duration.

In the implementation of FIG. 6, a feedback loop 67 is connected between the output of the BER measurement module 66 and the image generator 62 and eventually between the output of the selector 61 and the image generator 62 (see 69). The feedback loop 67 (and eventually 69) will provide the image generator 62 with an error signal to enable this generator 62 to vary as required the amplitude or phase (or other characteristics such as the frequency content) of the image 63 in order to closely track the characteristics of the real AMPS interferer 20. Obviously, the amplitude or phase (or other parameter) of the image 63 can be varied by the generator 62 until the BER comparison in selector 61 falls in favour of the image-removed baseband signal 65. This is likely to improve quality of the communication.

Obviously, feedback control of the generator 62 through the feedback loop 67 (and eventually 69) can be implemented through feedback control algorithms. Given the above information, it is believed to be within the capacity of one of ordinary skill in the art to build such an algorithm capable of fulfilling the required conditions of operation.

It should be pointed out that it is possible to combine:
- many image generators and corresponding BER measurement modules as illustrated in FIG. 5; with
- at least one image generator and BER measurement module with feedback loop as illustrated in FIG. 6.

Those of ordinary skill in the art will appreciate that the present invention also applies to interferers, narrowband or not, other than AMPS, for example GSM, CDMA, TDMA or any other type of radio signal (for example harmonics from another frequency bandwidth used for another telecommunication service, etc.) and having characteristics that are sufficiently known to enable development and production of corresponding images.

In the case of digital wireless technologies used for data communication, especially in circuit switched mode, the present invention would apply quite well when there is no actual data being sent. In the case where encryption is used, for silent voice or silent data, trial and error or full decoding will be required to find images that are worthwhile.

Also, just a word to mention that application is not limited to CDMA communication systems and to voice signals and data. With communication systems other than CDMA, processing of the signal in the receiver chain can involve operations completely different from the above described despreading scheme.

Finally, the present invention could be adapted to communication systems other than a cellular telephone system, for example a satellite data communication system.

Although the present invention has been described hereinabove by way of a preferred embodiment thereof, this embodiment can be modified at will, within the scope of the appended claims, without departing from the spirit and nature of the subject invention.

What is claimed is:

1. A method for attenuating an interferer of substantially known spectrum in a communication signal which has been transmitted through a transmission channel and processed through a signal-processing receiver chain, said method comprising:
   generating, from the substantially known spectrum and independently of the communication signal, at least one image representative of a replica of the interferer after processing through the signal-processing receiver chain;

subtracting the image representative from the processed communication signal to produce a subtraction signal;

calculating a quality-indicative parameter of the processed communication signal;

computing said quality-indicative parameter for the subtraction signal; and selecting, in relation to the quality-indicative parameter, one of the processed communication signal and subtraction signal for further processing through the signal-processing receiver chain.

2. A method for attenuating an interferer as recited in claim 1, wherein:

generating at least one image representative comprises producing, from the substantially known spectrum and independently of the communication signal, a plurality of different images each representative of a replica of the interferer after processing through the signal-processing receiver chain;

said subtracting comprises, for each image of the plurality of different images, subtracting the image representative from the processed communication signal to produce a corresponding subtraction signal;

said computing comprises computing said quality-indicative parameter for every subtraction signal; and said selection comprises selecting, in relation to the quality-indicative parameter, one of the processed communication signal and subtraction signals for further processing through the signal-processing receiver chain.

3. A method for attenuating an interferer as recited in claim 1, wherein:

generating at least one image representative comprises feedback controlling, in relation to the quality-indicative parameter of the subtraction signal, at least one feature of the image to improve said quality-indicative parameter of the subtraction signal.

4. A method for attenuating an interferer as recited in claim 3, wherein said at least one feature is an amplitude of the image representative.

5. A method for attenuating an interferer as recited in claim 3, wherein said at least one feature is a phase of the image representative.

6. A method for attenuating an interferer as recited in claim 1, wherein generating at least one image representative comprises:

generating said replica of the interferer; and processing said replica through transfer functions reproducing the signal-processing receiver chain to produce a processed interferer replica.

7. A method for attenuating an interferer as recited in claim 6, wherein generating at least one image representative further comprises amplifying the processed interferer replica to produce the image.

8. A method for attenuating an interferer as recited in claim 6, comprising both generating said replica of the interferer and processing said replica through transfer functions are conducted through a digital implementation.

9. A method for attenuating an interferer as recited in claim 8, wherein said digital implementation is selected from a group consisting of software, firmware and ASIC.

10. A method for attenuating an interferer as recited in claim 1, wherein generating at least one image representative of a replica of the interferer after processing through the signal-processing receiver chain comprises generating a silent replica of the interferer including no voice or data component.

11. A method for attenuating an interferer as recited in claim 1, wherein:

the interferer is a narrowband interferer;

the communication signal is a spread spectrum signal;

the signal-processing receiver chain incorporates a despreading scheme whose function is to convert the spread spectrum signal to a despread signal; and generating at least one image representative comprises:

producing a replica of the narrowband interferer;

processing said replica through transfer functions reproducing the signal-processing receiver chain including the despeading scheme.

12. A method for attenuating an interferer as recited in claim 11, wherein the narrowband interferer is an AMPS interferer, and the spread spectrum signal is a CDMA spread spectrum signal.

13. A method for attenuating an interferer as recited in claim 12, wherein the quality-indicative parameter are Bit Error Rate (BER) measurements of the despread signal and subtraction signal.

14. A method for attenuating an interferer as recited in claim 12, wherein producing a replica of the AMPS interferer comprises producing a silent replica of the AMPS interferer including no voice or data component.

15. A method for attenuating an interferer from a communication signal which has been transmitted through a transmission channel and processed through a signal-processing receiver chain, said method comprising:

generating a plurality of images of the interferer having different features;

for each interferer image, subtracting said interferer image from the processed communication signal to produce a corresponding subtraction signal;

calculating a quality-indicative parameter of the processed communication signal;

computing said quality-indicative parameter for every each subtraction signal; and selecting, in relation to the quality-indicative parameter, one of the processed communication signal and subtraction signals for further processing through the signal-processing receiver chain.

16. A method for attenuating an interferer as recited in claim 15, wherein:

the interferer is selected from a group consisting of a narrowband AMPS interferer, a TDMA interferer and a GSM interferer;

the communication signal is a CDMA spread spectrum signal;

the signal-processing receiver chain incorporates a despreading scheme whose function is to convert the CDMA spread spectrum signal to a despread baseband signal; and the quality-indicative parameter is Bit Error Rate (BER) measurements of the despread baseband signal and subtraction signals.

17. A method for attenuating an interferer as recited in claim 15, wherein generating one of the plurality of images comprises feedback controlling, in relation to the quality-indicative parameter of one of the subtraction signals corresponding to the plurality of images, a feature of said image in view of improving the quality-indicative parameter of said subtraction signal.

18. A method for attenuating an interferer as recited in claim 17, wherein feedback controlling of the feature of said one image comprises controlling the feature of said one image also in relation to said selecting to improve the quality-indicative parameter of said subtraction signal until said subtraction signal is selected for further processing through the signal-processing receiver chain.

19. A method for attenuating an interferer from a communication signal which has been transmitted through a transmission channel and processed through a signal-processing receiver chain, said method comprising:
   generating an image of the interferer;
   subtracting the interferer image from the processed communication signal to produce a subtraction signal;
   calculating a quality-indicative parameter of the processed communication signal;
   computing said quality-indicative parameter for the subtraction signal; and
   selecting, in relation to the quality-indicative parameter, one of the processed communication signal and subtraction signal for further processing through the signal-processing receiver chain;
   wherein generating an image of the interferer comprises feedback controlling, in relation to the quality-indicative parameter of the subtraction signal, at least one feature of the interferer image in view of improving said quality-indicative parameter of the subtraction signal.

20. A method for attenuating an interferer as recited in claim 19, wherein feedback controlling of at least one feature of the interferer image comprises controlling said at least one feature also in relation to said selecting to improve the quality-indicative parameter of the subtraction signal until said subtraction signal is selected for further processing through the signal-processing receiver chain.

21. A method for attenuating an interferer as recited in claim 19, wherein:
   the interferer is selected from a group consisting of: a narrowband AMPS interferer, a TDMA interferer and a GSM interferer;
   the communication signal is a CDMA spread spectrum signal;
   the signal-processing receiver chain incorporates a despreading scheme whose function is to convert the CDMA spread spectrum signal to a despread baseband signal; and
   the quality-indicative parameter is Bit Error Rate (BER) measurements of the despread baseband signal and subtraction signal.

22. A device for attenuating an interferer of substantially known spectrum in a communication signal which has been transmitted through a transmission channel and processed through a signal-processing receiver chain, said device comprising:
   a generator of at least one image representative of a replica of the interferer after processing through the signal-processing receiver chain, said generator having image generating means responsive to the substantially known spectrum of the interferer but having no connection to the communication signal;
   a subtractor of the image representative from the processed communication signal to produce a subtraction signal;
   a first calculator of a quality-indicative parameter of the processed communication signal;
   a second calculator of said quality-indicative parameter for the subtraction signal; and
   a selector of one of the processed communication signal and subtraction signal in relation to the quality-indicative parameter, for further processing through the signal-processing receiver chain.

23. A device for attenuating an interferer as recited in claim 22, wherein the image generating means further comprises an amplifier for applying a gain to said the at least one image representative of a replica of the interferer to thereby produce the image.

24. A device for attenuating an interferer as recited in claim 22, wherein said replica is a silent replica of the interferer including no voice or data component.

25. A device for attenuating an interferer as recited in claim 22, wherein:
   the interferer is a narrowband interferer;
   the communication signal is a spread spectrum signal;
   the signal-processing receiver chain incorporates a despreading scheme whose function is to convert the spread spectrum signal to a despread signal; and
   the generator comprises:
   a sub-generator of a replica of the narrowband interferer.

26. A device for attenuating an interferer as recited in claim 25, wherein the narrowband interferer is an AMPS interferer, and the spread spectrum signal is an CDMA spread spectrum signal.

27. A device for attenuating an interferer as recited in claim 26, wherein the first and second calculators comprises respective Bit Error Rate (BER) measurement means.

28. A device for attenuating an interferer as recited in claim 25, wherein said sub-generator comprises a digital implementation.

29. A device for attenuating an interferer as recited in claim 28, wherein said digital implementation is selected from a group consisting of: software, firmware and ASIC.

30. A device for attenuating an interferer of substantially known spectrum in a communication signal which has been transmitted through a transmission channel and processed through a signal-processing receiver chain, said device comprising:
   means for generating, in relation to the substantially known spectrum but independently of the communication signal, at least one image representative of a replica of the interferer after processing through the signal-processing receiver chain;
   means for subtracting the image representative from the processed communication signal to produce a subtraction signal;
   means for calculating a quality-indicative parameter of the processed communication signal;
   means for calculating said quality-indicative parameter for the subtraction signal; and
   means for selecting, in relation to the quality-indicative parameter, one of the processed communication signal and subtraction signal for further processing through the signal-processing receiver chain.

31. A device for attenuating an interferer from a communication signal which has been transmitted through a transmission channel and processed through a signal-processing receiver chain, said device comprising:
   a generator of a plurality of images of the interferer having different features being the phase and the amplitude of the images;
   for each interferer image, a subtractor of said interferer image from the processed communication signal to produce a corresponding subtraction signal;
   a first calculator of a quality-indicative parameter of the processed communication signal;
   a second calculator of said quality-indicative parameter for every subtraction signal; and
   a selector of one of the processed communication signal and subtraction signals in relation to the quality-indicative parameter, for further processing through the signal-processing receiver chain.

32. A device for attenuating an interferer as recited in claim 31, wherein:
the interferer is selected from a group consisting of a narrowband AMPS interferer, a TDMA interferer and a GSM interferer;
the communication signal is a CDMA spread spectrum signal;
the signal-processing receiver chain incorporates a despreading scheme whose function is to convert the CDMA spread spectrum signal to a despread baseband signal; and
the first and second calculators comprise respective Bit Error Rate (BER) measurement modules which, in operation, supply BER measurements of the despread baseband signal and subtraction signal.

33. A device for attenuating an interferer as recited in claim 31, wherein said generator comprises a feedback control of a feature of one of the plurality of images in relation to the quality-indicative parameter of one of the subtraction signals corresponding the images, in view of improving the quality-indicative parameter of the subtraction signals.

34. A device for attenuating an interferer as recited in claim 33, wherein said feedback control is also responsive to the selection by said selector.

35. A device for attenuating an interferer from a communication signal which has been transmitted through a transmission channel and processed through a signal-processing receiver chain, said device comprising:
means for generating a plurality of images of the interferer having different features;
for each interferer image, means for subtracting said interferer image from the processed communication signal to produce a corresponding subtraction signal;
means for calculating a quality-indicative parameter of the processed communication signal;
means for computing said quality-indicative parameter for every subtraction signal; and
means for selecting, in relation to the quality-indicative parameter, one of the processed communication signal and subtraction signals for further processing through the signal-processing receiver chain.

36. A device for attenuating an interferer from a communication signal which has been transmitted through a transmission channel and processed through a signal-processing receiver chain, said device comprising:
a generator of an image of the interferer;
a subtractor of the interferer image from the processed communication signal to produce a subtraction signal;
a first calculator of a quality-indicative parameter of the processed communication signal;
a second calculator of said quality-indicative parameter for the subtraction signal; and
a selector of one of the processed communication signal and subtraction signal in relation to the quality-indicative parameter, for further processing through the receiver;
wherein the generator comprises a feedback control of at least one feature of the interferer image in relation to the quality-indicative parameter of the subtraction signal, in view of improving said quality-indicative parameter of the subtraction signal.

37. A device for attenuating an interferer as recited in claim 36, wherein said feedback control is responsive to the selection by said selector.

38. A device for attenuating an interferer as recited in claim 36, wherein:
the interferer is selected from a group consisting of a narrowband AMPS interferer, a TDMA interferer and a GSM interferer;
the communication signal is a CDMA spread spectrum signal;
the signal-processing receiver chain incorporates a despreading scheme whose function is to convert the CDMA spread spectrum signal to a despread baseband signal; and
the first and second calculators comprise respective BER measurement modules.

39. A device for attenuating an interferer from a communication signal which has been transmitted through a transmission channel and processed through a signal-processing receiver chain, said device comprising:
means for generating an image of the interferer;
means for subtracting the interferer image from the processed communication signal to produce a subtraction signal;
means for calculating a quality-indicative parameter of the processed communication signal;
means for calculating said quality-indicative parameter for the subtraction signal; and
means for selecting, in relation to the quality-indicative parameter, one of the processed communication signal and subtraction signal for further processing through the receiver;
wherein the means for generating an image of the interferer comprises means for feedback controlling, in relation to the quality-indicative parameter of the subtraction signal, at least one feature of the interfere image in view of improving said quality-indicative parameter of the subtraction signal.

* * * * *

UNITED STATES PATENT AND TRADEMARK OFFICE
CERTIFICATE OF CORRECTION

| | | |
|---|---|---|
| PATENT NO. | : 6,999,501 B1 | |
| APPLICATION NO. | : 09/662740 | |
| DATED | : February 14, 2006 | |
| INVENTOR(S) | : Sawyer | |

It is certified that error appears in the above-identified patent and that said Letters Patent is hereby corrected as shown below:

Column 1, Line 7, after "Invention" insert -- : --.

Column 2, Line 37, delete "replical" and insert -- replica --, therefor.

Column 4, Line 63, delete "$PN_{codex}$" and insert -- $PN_{codeX}$ --, therefor.

Column 5, Line 41, delete "minimun" and insert -- minimum --, therefor.

Column 10, Line 12, in Claim 11, delete "despeading" and insert -- despreading --, therefor.

Column 10, Line 18, in Claim 13, after "parameter" delete "are" and insert -- is --, therefor.

Column 10, Line 36, in Claim 15, after "parameter for" delete "every".

Column 10, Line 65, in Claim 18, delete "one" before "image".

Column 12, Line 20, in Claim 26, delete "an" before "CDMA".

Column 12, Line 23, in Claim 27, delete "comprises" and insert -- comprise --, therefor.

Column 12, Line 65, in Claim 31, delete "every" and insert -- each --, therefor.

Column 13, line 22, in Claim 33, delete "images" and insert -- image --, therefor.

Column 14, line 27, in Claim 38, delete "BER" and insert -- Bit Error Rage (BER) --, therefor.

UNITED STATES PATENT AND TRADEMARK OFFICE
CERTIFICATE OF CORRECTION

PATENT NO. : 6,999,501 B1
APPLICATION NO. : 09/662740
DATED : February 14, 2006
INVENTOR(S) : Sawyer It is certified that error appears in the above-identified patent and that said Letters Patent is hereby corrected as shown below:

Column 14, Line 49, in Claim 39, delete "interfere" and insert -- interferer --, therefor.

Signed and Sealed this

First Day of April, 2008

JON W. DUDAS
*Director of the United States Patent and Trademark Office*